2 Sheets—Sheet 1.

F. W. FOX.

DRAWING, SPINNING, AND TWISTING APPARATUS.

No. 10,258. Reissued Dec. 12, 1882.

WITNESSES:
H. Turner
J. J. Jobin

INVENTOR:
F. W. Fox
by his attorneys
Howson and Sons

2 Sheets—Sheet 2.

F. W. FOX.

DRAWING, SPINNING, AND TWISTING APPARATUS.

No. 10,258. Reissued Dec. 12, 1882.

WITNESSES:
H. Turner.
James J. Tobin.

INVENTOR:
Frederick W. Fox
by his attorneys
Brown and Sons

UNITED STATES PATENT OFFICE.

FREDERICK WILLIAM FOX, OF WINDHILL, COUNTY OF YORK, ENGLAND.

DRAWING, SPINNING, AND TWISTING APPARATUS.

SPECIFICATION forming part of Reissued Letters Patent No. 10,258, dated December 12, 1882.

Original No. 255,612, dated March 28, 1882. Application for reissue filed November 7, 1882. Patented in England November 29, 1881.

*To all whom it may concern:*

Be it known that I, FREDERICK WILLIAM FOX, a subject of the Queen of Great Britain, and a resident of Windhill, in the county of York, England, have invented certain Improvements in Drawing, Spinning, and Twisting Apparatus, (for which I have obtained Provisional Protection in Great Britain, No. 5,218, November 29, 1881,) of which the following is a specification.

The object of this invention is to construct a spinning, twisting, and drawing apparatus which will produce a more smooth and even yarn at a greater speed and with less expenditure of labor than heretofore; and my invention consists in combining with the usual cap-spinning appliances rings and travelers, substantially as hereinafter set forth.

Figure 1:
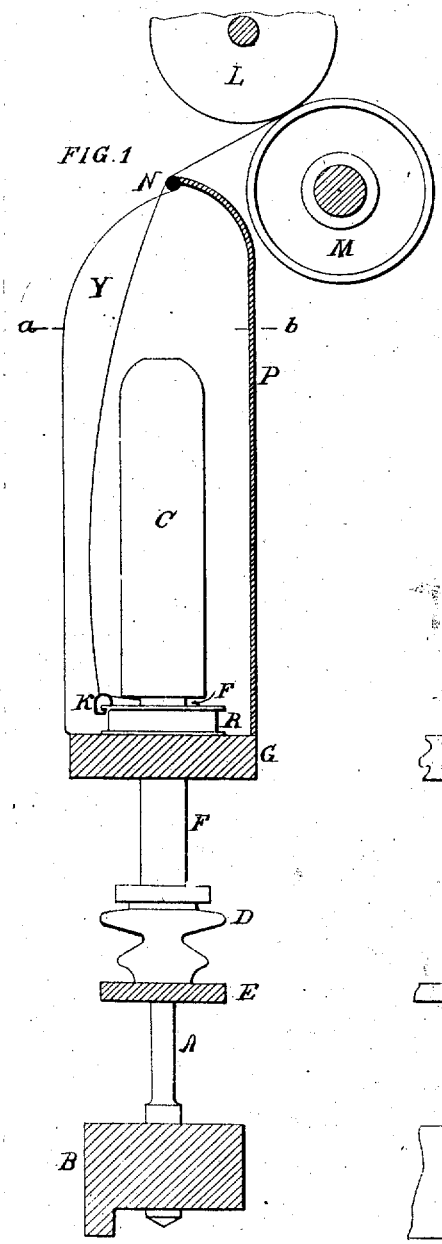
Figure 2:
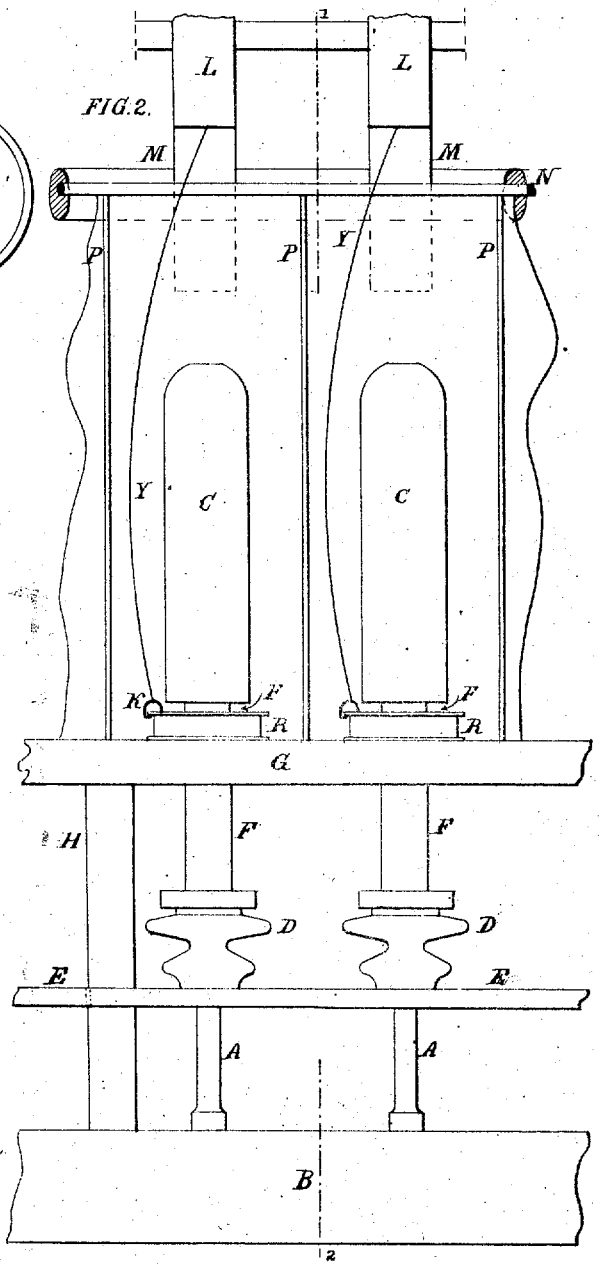
Figure 3:
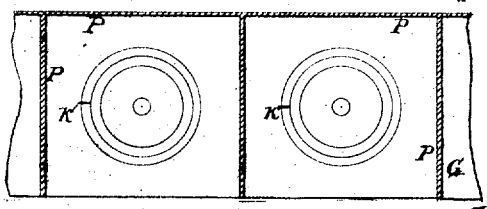
Figure 4:
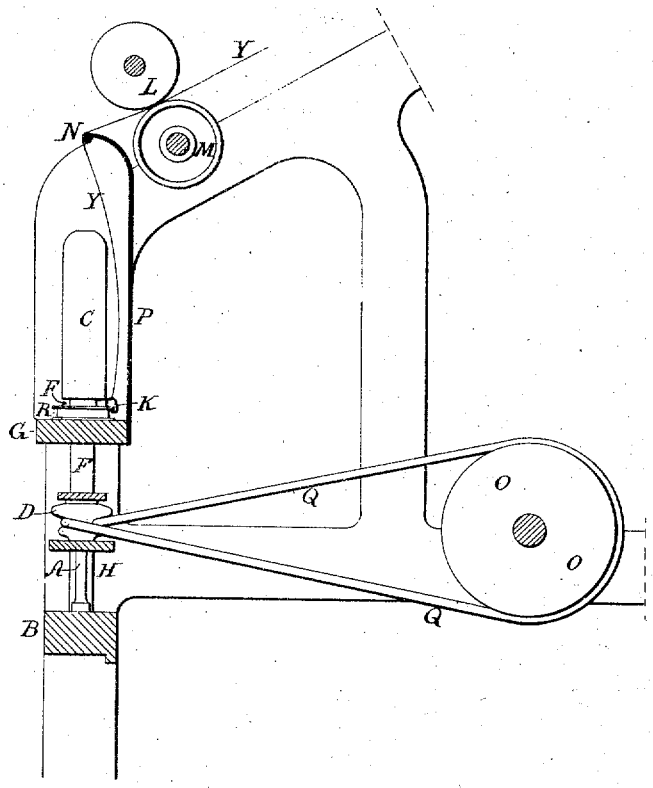

In the accompanying drawings, Figure 1 is a vertical section on the line 1 2, Fig. 2, of sufficient of a spinning and twisting machine to illustrate my invention. Fig. 2 is a front view, and Fig. 3 is a sectional plan view on the line *a b*, Fig. 1. Fig. 4, Sheet 2, is a vertical section, on a reduced scale, of part of a spinning and twisting machine containing my improvements.

A are the fixed upright spindles, mounted on the longitudinal rail B of the machine, and carrying at their tops the stationary caps C, as in ordinary spinning, twisting, and drawing machines. On each spindle is mounted a whirl, D, carrying a bobbin, F, on which the yarn is to be spun, the whirls being supported by the lifter-plate E, which may have the necessary rising and falling motion imparted to it to build the yarn onto the bobbins by the usual traverse motion, consisting of chains or cords connected to the lifter-plate and passing over pulleys and operated by a traverse-bar under the control of a cam, in the ordinary manner. Above the lifter-plate E, I provide a ring-rail, G, mounted on pillars H, carried by the fixed rail B of the machine, and this ring-rail G carries a ring, R, with a traveler, K, for each spindle. The ring-rail is at such a height in respect to the caps that when the machine is in operation the top of the traveler K is slightly above the level of the bottom edge of the cap C. Between the caps, and at the back, are partitions P, of tin or other convenient material, to inclose each cap and bobbin on three sides to prevent the threads of yarn of one bobbin coming into contact with those of an adjoining bobbin.

The spindles may be driven in the usual manner from a drum, O, by belts Q, passing round the whirls D. The yarn to be spun, twisted, and drawn passes from between the pair of front rollers, L M, over a guide rod or bar, N, the front edge of which is preferably in the same vertical plane as the centers of the rings. From the guide-rod the yarn Y passes downward and through the traveler K and in contact with the bottom of the cap, and is thence built onto the rotating bobbin. The traveler K, revolving, gives a twist to the yarn Y the entire distance from the rollers L M to the bobbin, and on passing over the guide rod or bar N the yarn rolls on the same, wrapping the loose or projecting fibers round the body of the yarn. On leaving the traveler to be wound on the spindle the yarn comes into contact with the lower edge of the cap, which further wraps and smooths the loose fibers, producing a smooth and even yarn at a speed at which cap-tubes are usually run.

I claim as my invention—

The combination of the spindles, caps, whirls, and operating devices of a cap-spinning machine with a ring-rail, rings, and travelers, all substantially as set forth.

In testimony whereof I have signed my name to this specification in the presence of two subscribing witnesses.

FREDK. WM. FOX.

Witnesses:

JOHN WAUGH,

JOHN GILL.